Figure 1:
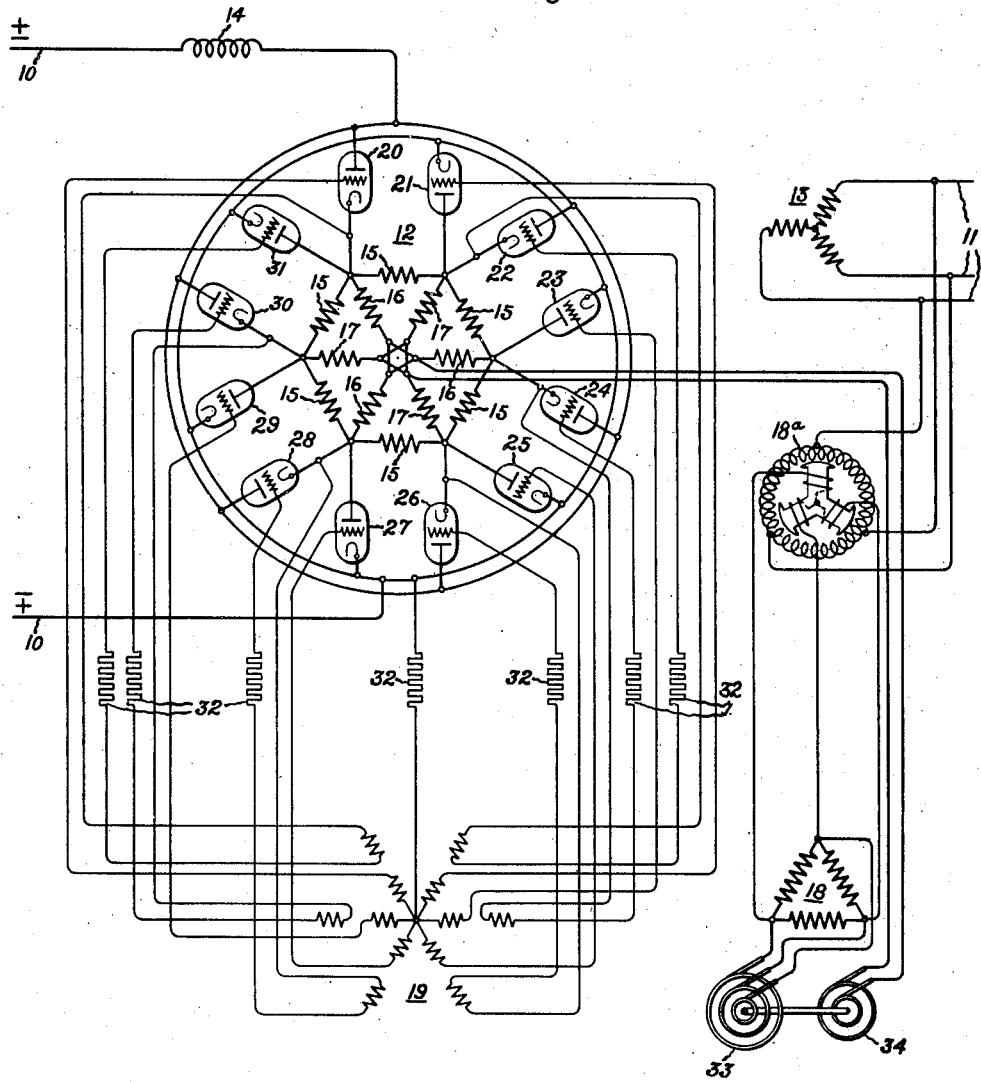

Oct. 10, 1933.   C. H. WILLIS   1,929,725
ELECTRIC VALVE CONVERTING APPARATUS
Filed Oct. 1, 1931   3 Sheets-Sheet 1

Inventor:
Clodius H. Willis,
by Charles E. Tullar
His Attorney.

Oct. 10, 1933.  C. H. WILLIS  1,929,725
ELECTRIC VALVE CONVERTING APPARATUS
Filed Oct. 1, 1931   3 Sheets-Sheet 2

Inventor:
Clodius H. Willis,
by Charles E. Fuller
His Attorney.

Oct. 10, 1933.  C. H. WILLIS  1,929,725
ELECTRIC VALVE CONVERTING APPARATUS
Filed Oct. 1, 1931  3 Sheets-Sheet 3
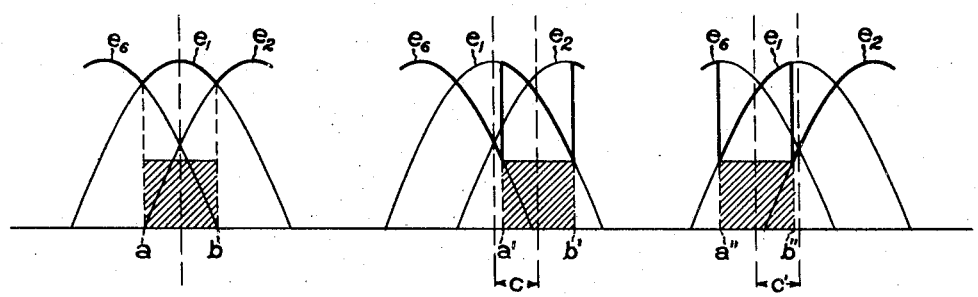
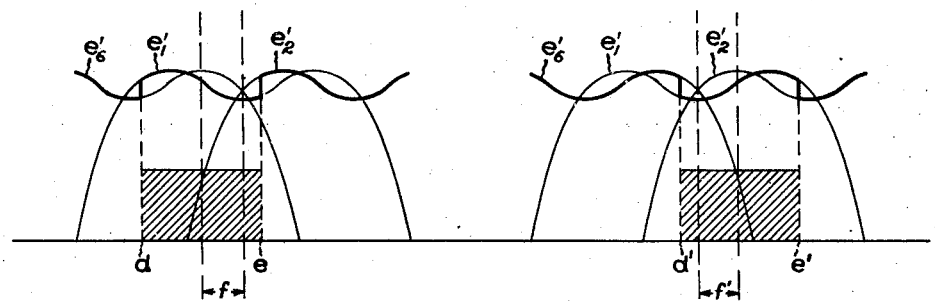
Inventor:
Clodius H. Willis,
by Chas. E. Tullar
His Attorney.

Patented Oct. 10, 1933

1,929,725

UNITED STATES PATENT OFFICE 1,929,725

ELECTRIC VALVE CONVERTING APPARATUS

Clodius H. Willis, Princeton, N. J., assignor to General Electric Company, a corporation of New York Application October 1, 1931. Serial No. 566,372

7 Claims. (Cl. 175—363)

My invention relates to electric valve converting apparatus and more particularly to such apparatus adapted to transmit energy between direct and alternating current circuits.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the face that a lagging power factor on the alternating current circuit corresponds to a transfer of load between the several electric valves at points in the cycle of alternating potential when the counter-electromotive force of the inductive winding connected between the valves opposes such commutation. The same principles apply when transmitting energy from an alternating current circuit of one frequency to an alternating current circuit of another frequency or the same frequency. In many cases, however, it is desirable to supply a lagging power factor alternating current load by means of an electric valve converting apparatus.

It is an object of my invention, therefore, to provide an improved electric power converting apparatus for transmitting energy between a direct current circuit and an alternating current circuit under any desired power factor conditions on the alternating current circuit.

It is another object of my invention to provide an improved electric valve converting apparatus for transmitting energy from a direct current circuit to an alternating current load circuit under lagging power factor conditions on the alternating current circuit.

It is a further object of my invention to provide an improved electric valve converting apparatus for transmitting energy from an alternating current circuit to a direct current circuit which is capable of drawing a leading power factor current from the alternating current circuit.

In accordance with my invention direct and alternating current circuits are interconnected through an inductive winding, or a network of inductive windings, and a plurality of electric valves. The several electric valves are successively rendered alternately conductive and non-conductive and the current is transferred between successive valves under any desired power factor conditions on the alternating current circuit at points in the cycle when the fundamental alternating potential of the inductive winding or windings connecting the successive valves opposes commutation by introducing into the system an alternating potential which is a harmonic of that of the alternating current circuit. By this means the wave form of the alternating potential in the system is distorted so that the desired commutation may be effected at points in the cycle at which such commutation would not ordinarily be possible.

Figure 2:
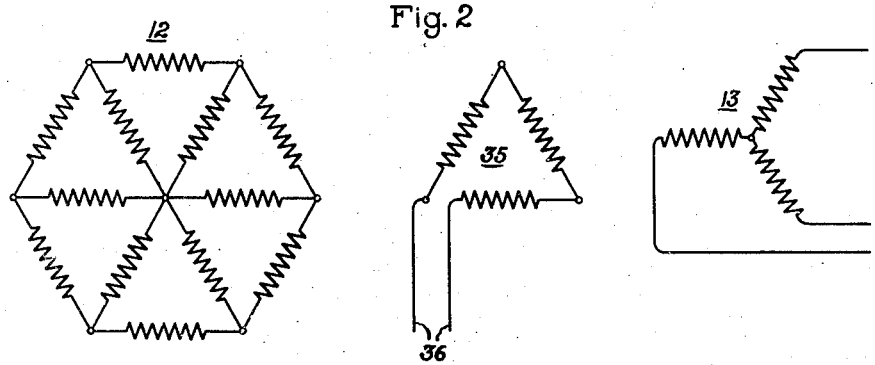
Figure 3:
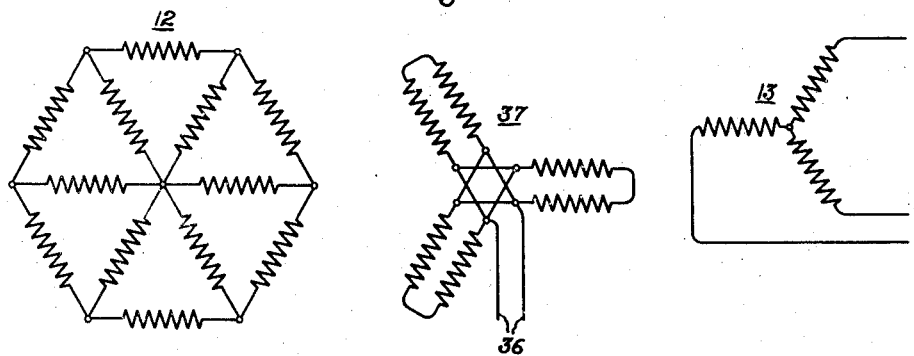
Figure 4:
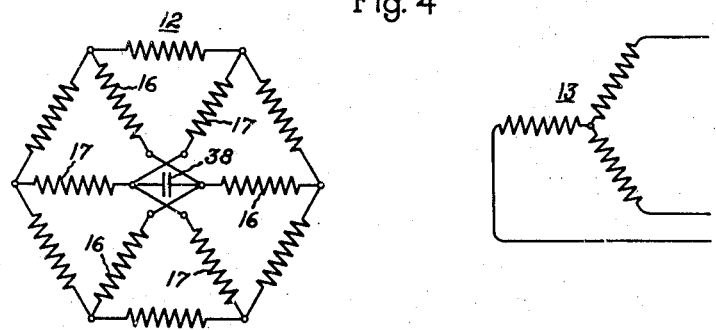

For a better understanding of my invention, together with other and further objects thereof, reference is had to the following description taken in connection with the accompanying drawings and its scope will be pointed out in the appended claims. In the accompanying drawings, Fig. 1 is a diagrammatic representation of my invention as applied to a full wave electric valve converting apparatus for transmitting energy between a direct current circuit and a three phase alternating current circuit; Figs. 2, 3 and 4 illustrate certain alternative arrangements for introducing the harmonic alternating potential into the converting system, and Figs. 5 and 6 show certain wave forms appearing in my converting apparatus to aid in the understanding of the invention.

Referring now to Fig. 1 of the drawings, I have illustrated an arrangement for transmitting energy between a direct current circuit 10 and a three phase alternating current circuit 11. This apparatus comprises a transformer network 12 connected across the direct current circuit 10 through electric valves 20—31 and an inductively coupled transformer network 13 connected to the polyphase circuit 11. If desired, a smoothing reactor 14 may be connected in the direct current circuit. Electric valves 20—31 are each provided wth an anode, a cathode and a control grid and may be of any of the several types well known in the art, although I prefer to use valves of the vapor electric discharge type. The transformer network 12 comprises the six phase ring or mesh connected windings 15 and two Y-connected windings 16 and 17 having independent neutrals and connected to alternate terminals of the ring connected windings 15. It will be understood that all windings of the networks 12 and 13 having the same phase relation may be wound on the same magnetic core or otherwise inductively coupled. In case the alternating current circuit 11 is connected to an independent source for determining its frequency and wave form, the grids of the electric valves 20—31 inc., may be excited therefrom by any suitable connection. By way of example, I have illustrated a grid transformer comprising a three-phase primary winding 18 connected to the alternating current circuit 11 through a rotary phase shifting transformer 18a, and a six-phase secondary winding 19 having separate phase windings for the excitation of the grids of those valves having independent cathode potentials. Current limiting resistors 32 are preferably included in the connections between the windings 19 of the grid transformers and the grids of the several electric valves. The grid transformer including the windings 19 should be self-saturating or separate means should be interposed between these windings and the grids of the electric valves to insure that they receive an excitation of peaked wave form, since each valve is to be made conductive for only 60 electrical degrees. However, this feature of supplying peaked excitation to the valve grids forms no part of my present invention, but is disclosed and broadly claimed in the copending application of B. D. Bedford, S. N. 485,335, filed September 29, 1930, and assigned to the same assignee as the present application. In case the alternating current circuit 11 is not connected to an independent source of electromotive force, the primary winding 18 of the grid transformer may be energized from any suitable source of alternating control potential of the desired frequency. In order to supply the harmonic excitation of the valve converting apparatus, I have provided a frequency changer comprising a synchronous motor 33 energized from the rotary phase shifting transformer 18a and directly connected to a single phase synchronous generator 34, which is connected between the neutrals of the Y-connected windings 16 and 17.

Neglecting the harmonic excitation of the system, the general principles of operation of the above described valve converting apparatus will be well understood by those skilled in the art. When the apparatus is operating as a rectifier, current will flow from the network 12 through one of the valves, for example valve 25, to the lower direct current terminal 10, which will be positive under these conditions, through the direct current load circuit, completing the circuit through electric valve 20. This current will be successively transferred between adjacent similarly connected valves at the frequency of the alternating current supply circuit, each of the several electric valves being conductive for one-sixth of a cycle. These conditions are shown in Fig. 5a of the drawings, in which there are illustrated portions of the waves of electromotive force of the Y-connected windings associated with three of the electric valves, for example, valves 25, 27 and 29, represented by the curves $e_6$, $e_1$ and $e_2$, respectively. If the voltage drop in the valves be neglected, the current will be commutated from the valve 25 to the valve 27 and then to the valve 29 at points $a$ and $b$ respectively. If the shaded area represents the current wave flowing in valve 27, it is seen that this current wave is co-axial with the wave of electromotive force $e_1$ and the apparatus will constitute a unity power factor load on the alternating current circuit. This represents simple, familiar rectifier operation. If the grid potentials of the electric valves be retarded so that the valve 27 is not made conductive until the point $a'$, as illustrated in Fig. 5b, that valve will conduct current during the interval $a'$—$b'$ and it is seen that the axis of this current wave, represented by the shaded area, is retarded with respect to the axis of the electromotive force wave by the angle $c$. In this way the average voltage of the direct current circuit may be readily controlled, but as this voltage is decreased it is seen that the current drawn from the alternating current circuit becomes more and more lagging. On the other hand it is not possible to transfer the current from the valve 25 to the valve 27 before the point $a$ of Fig. 5a, since the anode potential of the incoming valve, as represented by the curve $e_1$, must be greater than the anode potential of the outgoing valve $e_6$. That is, the ordinary controlled rectifier will always draw a current from the alternating current supply circuit which lags the impressed electromotive force to a greater or lesser extent.

On the other hand, if the system is operating as an inverter, current will flow from the upper or positive direct current terminal 10 into one of the electric valves, for example valve 20, through the transformer network 12 and electric valve 25 to the other side of the direct current circuit. Sixty electrical degrees after valves 20 and 25 have started to conduct current, electric valves 22 and 27 will be made conductive and the current will be transferred to them. In this way current will be successively commutated between the several electric valves, each pair of valves being conductive for 60 electrical degrees. If the alternating current circuit is connected to an independent source of counter-electromotive force for determining its frequency and wave form, Fig. 5a may also represent certain conditions of the apparatus when operating as an inverter, the curves $e_6$, $e_1$ and $e_2$ representing the curves of counter-electromotive force of the same windings as noted above. Again neglecting the voltage drop in the valves themselves, it is seen that the point $a$ is the very latest time at which the current may be commutated from the valve 25 to the valve 27, since the current can normally be commutated only from a valve associated with a winding of higher counter-electromotive force to a valve associated with a winding of lower counter-electromotive force. Under these conditions, as in the case of the rectifier, the limiting condition corresponds to unity power factor on the alternating current circuit. If now the grid potentials of the electric valves be advanced in phase as represented by Fig. 5c, the current may be commutated from the valve 25 to the valve 27 at the point $a''$. Under these conditions, the valve 27 will be conductive during the period $a''$—$b''$. It is seen that the axis of this current wave, represented by the shaded area, is advanced with respect to the electromotive force wave $e_1$ by the angle $c'$. In other words, without some special provision, an electric valve inverter will supply only loads having a leading power factor.

Referring now to Fig. 6a the curves $e'_6$, $e'_1$ and $c'_2$ represent the electromotive force waves of the same transformer windings with the addition of a prominent third harmonic. With these wave forms and with the apparatus operating as a rectifier, it is now seen that it is now possible to transfer current from the valve 25 to the valve 27 at the point $d$ and from the valve 27 to the valve 29 at the point $e$. It is seen that the axis of the current wave, represented by the shaded area, leads the axis of the electromotive force wave $e'_1$ by the angle $f$; that is, the rectifier is now drawing a leading current from the alternating current circuit.

Referring now to Fig. 6b, which represents conditions when the apparatus is operating as an inverter and in which the waves $e'_6$, $e'_1$ and $e'_2$ represent the waves of counter-electromotive force of the respective windings, it is seen that it is now possible to transfer the load current from the valve 25 to the valve 27 at the point $d'$, since the counter-electromotive force of the winding associated with the incoming valve at that point in the cycle is less than that of the winding associated with the outgoing valve. Similarly the current may be transferred from the valve 27 to the valve 29 at the point $e'$. The axis of the current wave, represented by the shaded area, is now retarded with respect to the axis of the electromotive force wave $e'_1$ by the angle $f'$; that is, the inverter is supplying a lagging current to the alternating current circuit. Thus, with the apparatus operating either as a rectifier or an inverter, it is possible to control the phase of the current on the alternating current circuit, and with it the relative voltages of the two circuits, from zero to substantially 90 degrees leading or lagging. It will be apparent that the control of the phase relations of the current in the alternating current circuit 11 is effected by controlling the phase relations of the grid potential supplied to the several electric valves by means of the rotary phase shifting transformer 18a. In order to secure the maximum range of power factor control, it is necessary to vary the phase of the harmonic commutating potential in accordance with variations in the phase of the load current of the apparatus; that is, in accordance with variations in the phase of the grid potentials of the several electric valves. This may be accomplished as illustrated by energizing the frequency changer comprising the motor 33 and the generator 34 through the rotary phase shifting transformer 18a. By connecting the transformer winding 13 in Y, as illustrated, the harmonic commutating potential will not appear in the electromotive force of the alternating current circuit itself; but, in case the distorted wave forms resulting from the occurrence of such a harmonic are not objectionable, the winding 13 may be connected in delta and the harmonic commutating potential may be supplied therefrom. In such a case the independent source of harmonic commutating potential shown as a generator 34 may be omitted.

In Fig. 2 there is illustrated an alternative arrangement for introducing the harmonic electromotive force into the transformer network. In this case, an open delta tertiary winding is provided and a third harmonic is introduced into the opening in the delta. In Fig. 3 two Y-connected tertiary windings provided with independent neutrals are associated with the transformer network and the harmonic electromotive force is introduced between these two neutrals in a manner similar to that of Fig. 1. In Fig. 4 is shown a modification of my invention in which the third harmonic commutating electromotive force is supplied by a capacitor 38 connected between the neutral points of the Y-connected windings 16 and 17. In this arrangement the capacitor 38 is effectively in series with a portion of the direct current circuit since the diametral connection between any two valves includes one winding of each of the networks 16 and 17. Thus the capacitor 38 is charged to one polarity during the interval in which one pair of valves is conducting and is charged to an opposite polarity during the succeeding interval. In the six-phase arrangement shown, the potential of the capacitor 38 thus reverses at three times the frequency of the alternating current circuit and provides a harmonic electromotive force for commutating the current between the valves as explained above.

While I have illustrated my invention as applied to a six-phase electric valve converting apparatus employing a third harmonic electromotive force for commutating the current between the several electric valves at any desired power factor, it will be well understood by those skilled in the art that it is not limited thereto, but is equally applicable to a system of any number of phases including a single phase system and that harmonic electromotive forces other than the third may be utilized, although I have found the third harmonic most suitable for the circuits illustrated in this application. It will also be understood that the transformer network comprising windings 12 and 13 may be replaced directly by the windings of a polyphase motor in case it is desired to operate such a motor from a direct current circuit. My invention is equally applicable to a half-wave valve converting apparatus, in which case only a single valve need be connected to each terminal of the network 12 and one side of the direct current circuit may be connected to the neutral of the network 12 or the neutral of the source of hamonic commutating electromotive force.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A system for transmiting energy between direct and alternating current circuits comprising a polyphase inductive network and a plurality of electric valves for interconnecting said circuits, means for controlling the conductivity of said valves, and means for commutating the current between said valves under any desired power factor conditions on said alternating current circuit comprising means for producing in said inductive network an alternating potential which is a harmonic of that of said alternating current circuit, and means for varying the phase of the harmonic alternating potential in accordance with the power factor of the alternating circuit.

2. A system for transmitting energy between direct and polyphase alternating current circuits comprising a network of inductive windings provided with a plurality of independent neutrals, a plurality of electric valves for interconnecting said network and said direct current circuit, means for controlling the conductivity of said valves, and a source of alternating potential which is a harmonic of that of said alternating current circuit connected between said neutrals to commutate the current between said valves under any desired power factor conditions on said alternating current circuit.

3. A system for transmitting energy between direct and polyphase alternating current circuits comprising a polyphase network of inductive windings, a plurality of electric valves for interconnecting said network and said direct current circuit, means for controlling the conductivity of said valves, an auxiliary inductive winding for each phase of said network and coupled thereto, said auxiliary windings being connected into an independent network, and means for introducing into said auxiliary network an alternating potential which is a harmonic of that of said alternating current circuit to commutate the current between said valves under any desired power factor conditions on said alternating current circuit.

4. A system for transmitting energy between direct and polyphase alternating current circuits comprising a polyphase network of inductive windings provided with a plurality of independent neutrals, a plurality of electric valves for interconnecting said network and said direct current circuit, means for controlling the conductivity of said valves, and a capacitor connected between said neutrals to commutate the current between said valves under any desired power factor conditions on said alternating current circuits.

5. A system for transmitting energy between direct and alternating current circuits comprising an inductive winding and a plurality of electric valves for interconnecting said circuits, each of said valves being provided with a control grid, and means for controlling the power factor at which energy is transmitted between said circuits comprising a source of periodic potential for exciting said control grids, means for introducing into said system an alternating potential which is a harmonic of that of the alternating current circuit, and means for simultaneously varying the phase of said grid potential and said harmonic potential.

6. A system for transmitting energy between direct and alternating current circuits comprising an inductive winding and a plurality of electric valves for interconnecting said circuits, each of said valves being provided with a control grid, and means for controlling the power factor at which energy is transmitted between said circuits comprising a source of variable phase periodic potential for exciting said control grids, means for introducing into said system an alternating potential which is a harmonic of that of the alternating current circuit, and means for varying the phase of said harmonic potential in accordance with variations in phase of said grid potential.

7. A system for transmitting energy between direct and alternating current circuits comprising an inductive winding and a plurality of electric valves for interconnecting said circuits, each of said valves being provided with a control grid, and means for controlling the power factor at which energy is transmitted between said circuits comprising a source of periodic potential for exciting said control grids, means for introducing into said system an alternating potential which is an nth harmonic of that of said alternating current circuit, and means for shifting the phase of said grid potential and for simultaneously shifting the phase of said harmonic potential n times that of said grid potential.

CLODIUS H. WILLIS.